Figure 1:
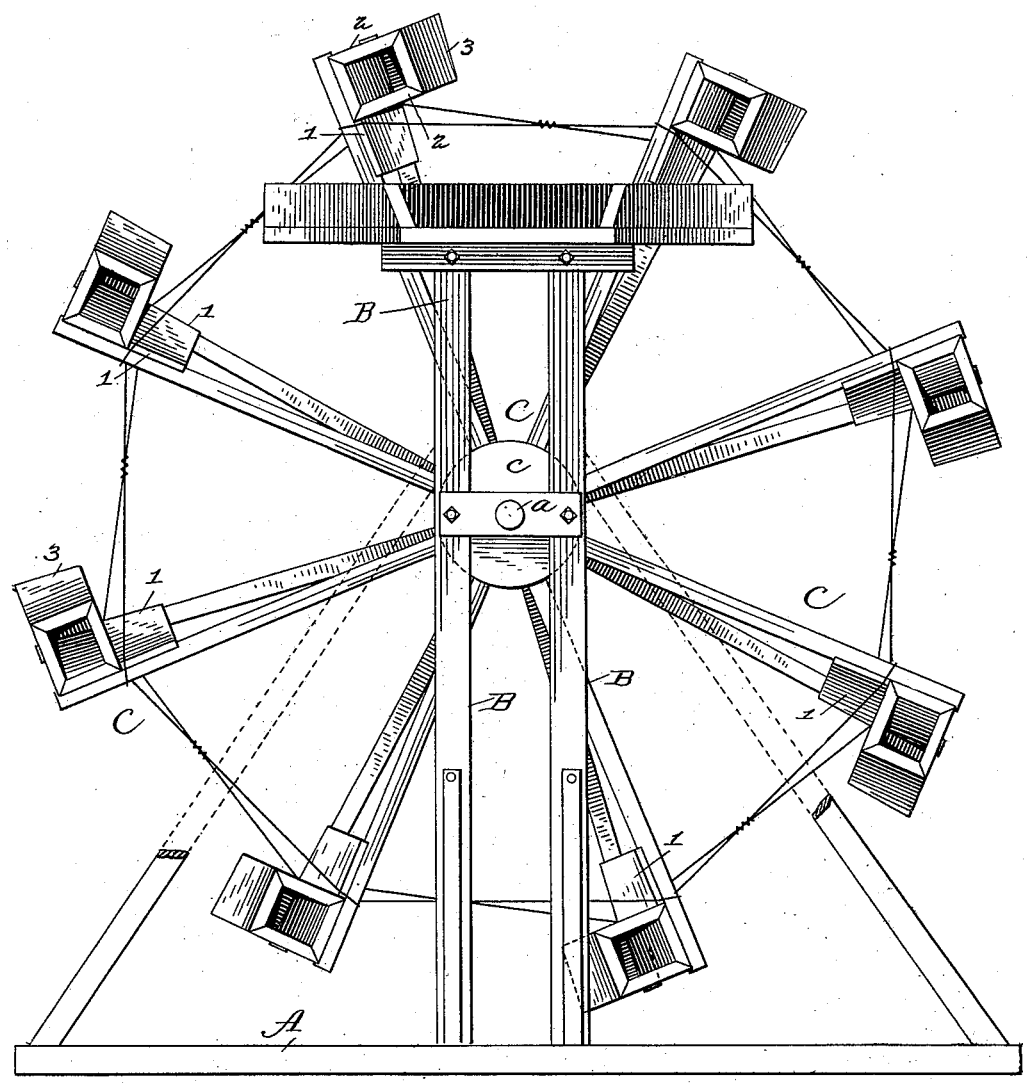

(No Model.)  2 Sheets—Sheet 1.

C. B. COX.
IRRIGATION OF LAND.

No. 334,645. Patented Jan. 19, 1886.

Attest:
Walter Donaldson
F. L. Middleton

Inventor
Chas. B. Cox
by Joyce & Spear
Att'ys (No Model.) 2 Sheets—Sheet 2.
C. B. COX.
IRRIGATION OF LAND.
No. 334,645. Patented Jan. 19, 1886.
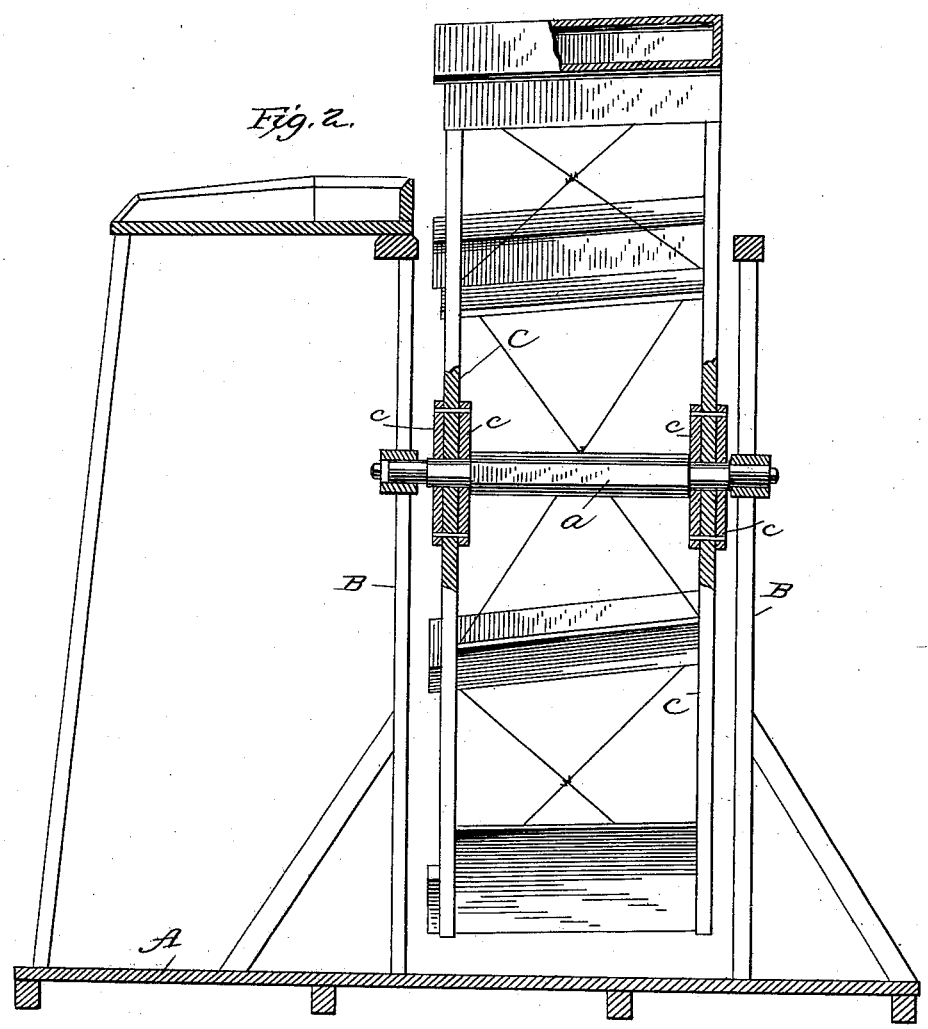
Fig. 2.
Fig. 3.
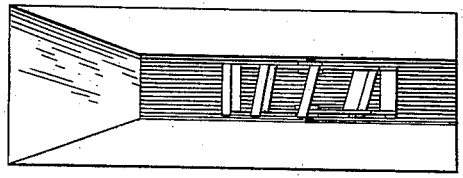
Attest:
Walter Donaldson
F. L. Middleton
Inventor:
Chas. B. Cox
by Joyce & Spear
Attys.

UNITED STATES PATENT OFFICE.

CHARLES B. COX, OF SAN MARCIAL, TERRITORY OF NEW MEXICO.

IRRIGATION OF LAND.

SPECIFICATION forming part of Letters Patent No. 334,645, dated January 19, 1886.

Application filed May 28, 1885. Serial No. 166,950. (No model.)

*To all whom it may concern:*

Be it known that I, CHARLES B. COX, of San Marcial, in the county of Socorro and Territory of New Mexico, have invented a new and useful Improvement in Irrigation of Land; and I do hereby declare that the following is a full, clear, and exact description of the same.

My invention relates to apparatus for the irrigation of land where this is necessary on account of the nature of the soil or the scarcity of rain-falls.

The invention is an improvement in that class of apparatus consisting of a wheel carrying a series of buckets upon its periphery, the said buckets being so arranged as to be adapted to take in water from the stream which moves the wheel and discharge it at the highest point of the wheel into a distributing flume or trough.

The invention consists of certain details of construction, whereby I am enabled to better carry out the object of the invention.

In the drawings, Figure 1 represents a front view of my improvement, and Fig. 2 a central vertical section thereof. Fig. 3 is a diagram of a modification.

A represents in these drawings the wharf, pile, or platform upon which the device is supported. Suitable posts, B B, extend up from this platform and support suitable bearing-boxes for the journals of the operating and carrying wheel C. This wheel may be supported as shown, or in any other suitable or convenient manner, and the posts may be braced and strengthened as much as is desirable or necessary.

The wheel C consists of the central shaft, $a$, the disks $c\ c$ upon each end of the shaft, and the spokes clamped between the said disks. Any suitable number of spokes may be used. I prefer to brace them by wire braces fastened to each post or spoke, running diagonally to the spoke on the opposite side and in advance, the wires of two pairs crossing in the center, and thereby materially strengthened. The spokes at each end of the shaft do not have the same vertical inclination, as shown in the front view, Fig. 1. The front spokes have a greater inclination than the rear for a purpose hereinafter fully set forth. Upon the extreme end of the spokes buckets are secured extending across the line of the wheel's periphery and secured to the front and rear spokes opposite each other. I have shown eight of these buckets; but it will be understood that more or less may be used. This consists of a side, 1, top and bottom pieces, 2 2, and a second side piece, 3, a suitable end piece being also provided. This bucket is secured to the spokes of the front and rear series, and on account of the difference in the angle of these spokes the front of the bucket will incline to the left. (See the top bucket in Fig. 3.) The side marked 1 of the bucket is of greater width than the bucket itself, and serves as a paddle by which the turning of the wheel by the waters of the river or stream is materially aided. At the highest point of the wheel the bucket is practically horizontal, but with each movement to the left the front of the bucket occupies a lower position in relation to the rear of the bucket until a half-turn has been made, when the bucket again assumes a horizontal, or approximately horizontal, position, but in an inverted position from that which it occupies at the opposite extreme. The mouth of the bucket at this point is farther advanced to the right than the rear and begins to take in water at this position, being beneath the surface. As the wheel revolves, what is the side of the bucket in its lowest position becomes the upper part, and the mouth of the bucket rises above the line of the rear thereof, and in this way the contents of the bucket cannot run out. As the bucket rises above the quarter-turn, it begins to assume a more horizontal position, and at this point it comes opposite the upper broad end of a flume or trough, which receives the water from the buckets from this point to a point on the opposite side of the center in the downward movement of the buckets, thereby catching all the water which flows from the buckets in their passage across the top.

The flume is supported in close proximity to the mouths of the buckets, and suitable troughs may be provided to direct the water to the land to be irrigated.

The current of the river will be sufficient to revolve the wheel, and after the wheel is once set up nothing more will be necessary to get a steady supply of water.

In the diagram, Fig. 3, I have shown the wheel as mounted between two hulls, with a diverging or flaring mouth facing upstream, whereby in sluggish streams the current may be concentrated at one point and the full force applied to the wheel.

Having thus described my invention, what I claim is—

The described apparatus, consisting of a hub having spokes extending from each end of the periphery thereof, with one set slightly in advance of the opposite set, buckets attached directly to the ends of these spokes in an inclined position due to the arrangement of the spokes, the said buckets serving also to brace the spokes, paddle-boards forming one side of said buckets, and wire braces extending from one bucket to another, all substantially as described.

In testimony whereof I have signed my name to this specification in the presence of two subscribing witnesses.

CHARLES B. COX.

Witnesses:
C. A. ROBINSON,
TERENCE MULLEN.